United States Patent
Bohner et al.

(10) Patent No.: US 6,336,519 B1
(45) Date of Patent: Jan. 8, 2002

(54) STEERING SYSTEM FOR MOTOR VEHICLES

(75) Inventors: Hubert Bohner, Böblingen; Gerhard Kurz, Wendlingen; Karl-Eugen Laubacher, Köngen; Tobias Speidel, Stuttgart, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/471,319

(22) Filed: Dec. 23, 1999

(30) Foreign Application Priority Data

Dec. 23, 1998 (DE) .......................... 198 59 806

(51) Int. Cl.[7] .............................. B62D 5/00
(52) U.S. Cl. .................. 180/403; 180/406; 180/422
(58) Field of Search ................ 180/402, 403, 180/406, 407, 405, 443, 422

(56) References Cited

U.S. PATENT DOCUMENTS

| | | | |
|---|---|---|---|
| 3,580,352 A | * | 5/1971 | Hestad |
| 4,705,130 A | * | 11/1987 | Fukunaga ............... 180/402 |
| 4,865,144 A | * | 9/1989 | North ................... 180/402 |
| 5,247,441 A | * | 9/1993 | Serizawa et al. ........ 180/402 |
| 5,275,251 A | | 1/1994 | Thomsen et al. |
| 5,862,878 A | * | 1/1999 | Bohner et al. ........... 180/403 |
| 5,893,427 A | * | 4/1999 | Bohner et al. ........... 180/403 |
| 6,076,627 A | * | 6/2000 | Bohner et al. ........... 180/403 |
| 6,138,788 A | * | 10/2000 | Bohner et al. ........... 180/403 |

FOREIGN PATENT DOCUMENTS

| | | |
|---|---|---|
| GB | 2 173 458 | 10/1986 |
| GB | 2 308 107 | 6/1997 |

* cited by examiner

Primary Examiner—Anne Marie Boehler
(74) Attorney, Agent, or Firm—Crowell & Moring LLP

(57) ABSTRACT

A steering system is provided for motor vehicles, in which, during the normal operation, the driver adjusts an actual steering angle value generator by way of a steering handle. A control and automatic control arrangement correspondingly operates the steered vehicle wheels by a motor-operated adjusting assembly. For an emergency, a forced coupling is provided between the steering handle and the steered vehicle wheels which switches on automatically. This forced coupling is constructed such that a centering mode can be switched on, during which, when the forced coupling is at least partially switched off, the manual steering wheel can be adjusted until a position is reached. Thereby, in the straight-ahead position of the steered vehicle wheels, the manual steering wheel takes up a defined normal position.

9 Claims, 2 Drawing Sheets

STEERING SYSTEM FOR MOTOR VEHICLES

BACKGROUND OF THE INVENTION

This application claims priority of DE 198 59 806.8-21, filed Dec. 23, 1998, the disclosure of which is expressly incorporated by reference herein.

The present invention relates to a steering system provided for motor vehicles, having a steering handle which can be operated on the driver side, particularly a manual steering wheel, a steering adjusting assembly for the motor-driven steering adjustment of steered vehicle wheels, a desired steering angle value generator operated by the steering handle, and an actual steering angle value generator operated by the steered vehicle wheels. A control system operates the steering adjusting assembly as a function of a desired-actual value comparison of the steering angle. A manual force adjuster which, in correlation to the forces which occur between the steered vehicle wheels and the steering adjusting assembly, causes a reaction force on the steering handle as well as an adjusting stroke of the steering handle correlated with the steering angle changes of the steered vehicle wheels. An emergency system, which becomes automatically operative in the case of disturbances of the control system and assigned system parts, provides for the mechanical and/or hydraulic forced coupling of the steering handle and the steered vehicle wheels with one another.

Steering systems of the above-mentioned type are currently being developed. The "steer-by-wire" concept is implemented, i.e., in contrast to conventional steering systems, in the case of a normal operation, no forced coupling is provided between the steering handle or the manual steering wheel and the steered vehicle wheels; on the contrary, the steered vehicle wheels and the steering handle are operationally coupled with one another only by way of a control system. A manual force adjuster has the purpose of generating a steering resistance at the steering handle or at the manual steering wheel as a function of the driving condition. That is, the manual force adjuster causes a feedback of the steering forces effective at the steered vehicle wheels. Simultaneously, exterior effects can be avoided, such as shocks to the wheels when driving through potholes which, in conventional steering systems, result in knocks of the manual steering wheel.

In the event of a disturbance of the control system or of interacting system parts, a hydraulic or mechanical emergency system is provided which becomes automatically operative in the event of a disturbance. As a result, a hydraulic or—as in the case of previous steering systems—a mechanical forced coupling exists between the steering handle and the steered vehicle wheels.

As a rule, the conventional type of steering system operates in the normal operation with a variable ratio between the adjusting stroke of the steering handle and the steering angle change of the steered vehicle wheels. In which case, it is, however, preferably provided that, when the steered vehicle wheels are in the straight-ahead position, the steering handle takes up a fixedly defined straight ahead position. The above-mentioned variable steering ratio generally differs more or less clearly from the ratio of the emergency system.

If, during a cornering, i.e., in positions of the steered vehicle wheels and of the steering handle steered out of the condition for straight-ahead driving, the emergency system is switched on, after steering back the steered vehicle wheels into their straight-ahead position, the steering handle will not take up its normal straight-ahead position, but will be adjusted more or less far toward the right or left with respect to this normal straight-ahead position.

Although this does not represent a dangerous condition in a technical sense, the above-mentioned effect can be irritating to the driver. This is particularly true during parking maneuvers, during which the driver comparatively often pays attention to the respective position of the steering handle. In normal road driving, a driver will, as a rule, pay almost no attention to the position of the steering handle and will align steering maneuvers only according to the respective driving route, but, in an unfavorable position, a manual steering wheel may impair the view of the instruments.

Similar problems may occur if the steering system is set up for a track-guided steering operation, in which the vehicle follows, for example, automatically a road-side marginal strip or the like. During such an operating phase, with track-guided operation, the steering handle can optionally be made to stand still in the normal straight-ahead position. Should the emergency system now be switched on, the steering handle, while the steered vehicle wheels are in the straight-ahead position, may under certain circumstances have a position which is extremely far away from the normal straight-ahead position.

SUMMARY OF THE INVENTION

An object of the present invention is to improve the emergency operation in the case of a steering system.

According to the invention, this object has been achieved in that, on the driver side, the emergency system can be centered, while an assignment caused by the switching-on of the emergency system is changed between the positions of the steering handle and of the steered vehicle wheels. Thereby, in the straight-ahead position of the steered vehicle wheels, the steering handle takes up a defined position.

The present invention is based on the general recognition of providing a manual and/or automatic adjustment for the emergency system in order to assign the normal straight-ahead position of the steering handle to the straight-ahead position of the vehicle wheels.

According to a currently preferred embodiment of the invention, a warning signal can appear when the emergency system is not centered in order to draw the driver's attention to "unusual" positions of the steering handle.

According to a preferred modified embodiment of the invention, a computer-assisted centering mode, during which the forced coupling may optionally at least partially be separated, can be switched on. The computer accesses signals which reflect the positions of the steering handle and the steered vehicle wheels, particularly the signals of the desired steering angle value generator and the actual steering angle value generator, and automatically switches on the forced coupling when a relative position of the steering handle and the steered vehicle wheels has been reached which matches the centering and/or a relative movement between the steering handle and the steered vehicle wheels occurs which leads away from such a relative position.

In this centering mode, also in the event of a disturbance leading to the automatic switching-on of the emergency system, signals will still be regularly available for the positions of the steering handle and of the steered vehicle wheels. The reason is that, also in the event of a disturbance, the desired steering angle value generator and the actual steering angle value generator almost always remain operable. Correspondingly, a computer analyzing the above-mentioned signals can "recognize" whether or not, when the forced coupling is in effect, the steering handle is centered relative to the steered vehicle wheels or relative movements occurring between the steering handle and the steered vehicle wheels would result in an improvement or a deterioration of the centering.

It can optionally be provided that, when the centering mode is switched on, an automatic centering of the emergency system takes place. This will be possible if, despite the disturbance causing the switching-on of the emergency system, in addition to the sensor system for detecting the positions of the steering handle and of the steered vehicle wheels, assemblies, such as the steering adjusting assembly and/or the manual force adjuster are also available, by way of which, in a corresponding control by a computer, a relative adjustment becomes possible between the steering handle and the steered vehicle wheels.

For safety reasons, it can be expedient to permit the centering or to be able to switch on the centering mode only when the vehicle is stopped and/or at an extremely low vehicle speed. For the same reasons, only elements which do not self-lock should permit a separation of the forced coupling and/or a switching-on of the centering mode in the emergency operation.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
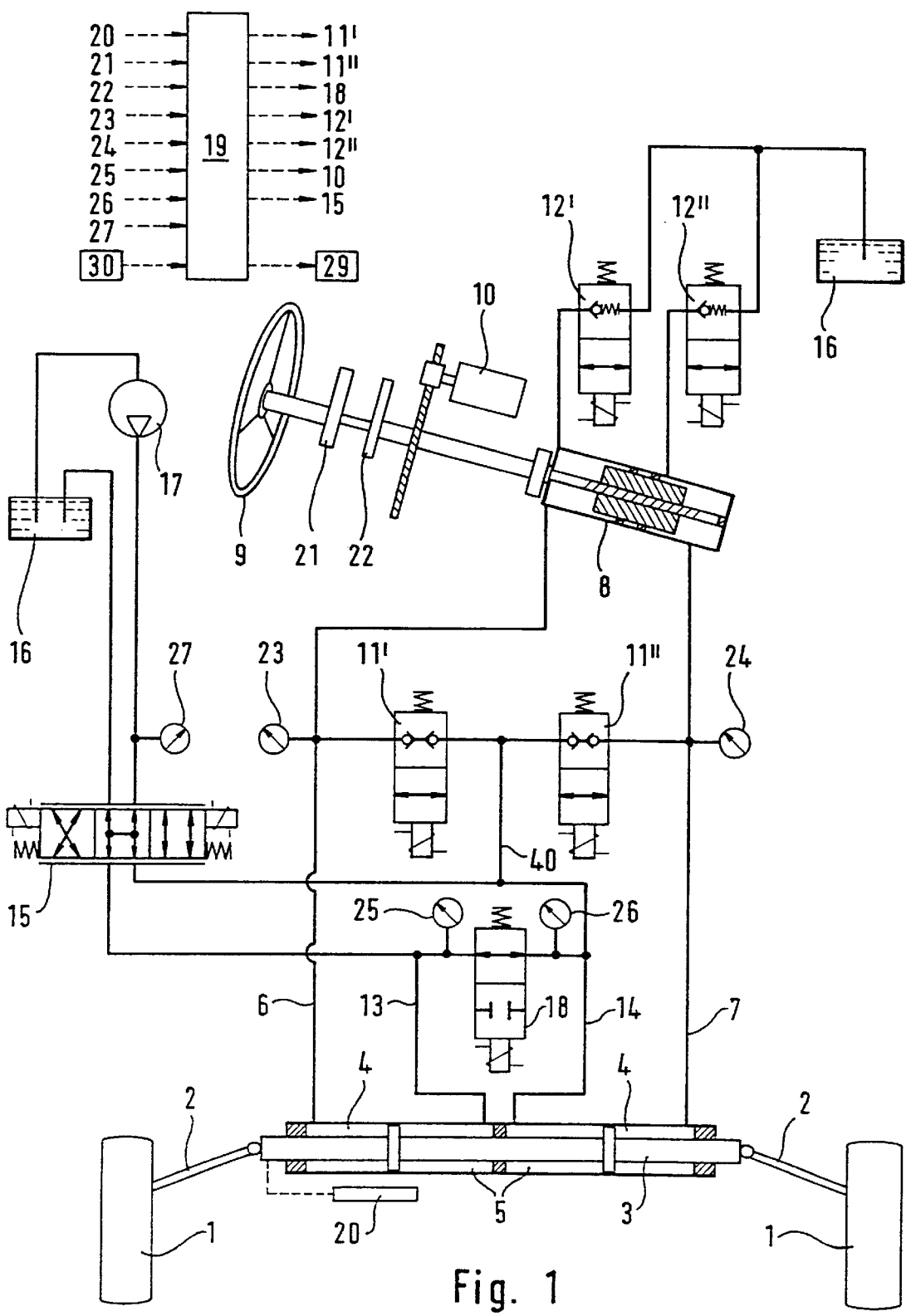
FIG. 1 is a schematic connection view of a first embodiment of the present invention.

In FIG. 1, a motor vehicle has steerable front wheels 1 which are steering-adjustably coupled with one another by tie rods 2 as well as a rod 3.

The rod 3 forms the piston rod of two piston-cylinder units 4, 5 which are arranged parallel to one another and are each constructed as double-acting units. The two chambers of the piston-cylinder unit 4 are arranged on both sides of the chambers of the piston-cylinder unit 5 arranged in-between.

The piston-cylinder unit 4 is coupled by two hydraulic lines 6, 7 with the two piston working spaces of a double-acting piston-cylinder unit 8, whose piston is mechanically connected with a manual steering wheel 9 with respect to the drive. The piston of the unit 8 is therefore displaced in FIG. 1 toward the right or the left when the manual steering wheel 9 is rotated clockwise or in the opposite direction. During the displacement of the piston of the unit 8, the manual steering wheel 9 is rotated correspondingly.

In addition, the manual steering wheel is connected with a non-self-locking electric motor 10 with respect to the drive. The electric motor 10, when the motor shaft is held fast, is capable of operating as a pure force generator, whose purpose will be explained below.

Between the hydraulic lines 6, 7, a normally closed shut-off valve arrangement with the shut-off valves 11', 11" is arranged which, jointly or separately, by the energizing of their operating magnets, can be changed over against the force of a restoring spring system from the illustrated closed position into their open position. When the electric current acting upon the respective operating magnet is switched off, the valves 11, 11 are automatically brought by the restoring spring system into the illustrated closed position or are held in this position.

Ventilating valves 12', 12" are assigned to the lines 6, 7 and the chambers of the piston-cylinder unit 8 connected therewith. The ventilating valves 12', 12", in the illustrated closed position, also take over the function of pressure control valves. By energizing assigned operating magnets, the ventilating valves 12', 12" can be changed jointly or separately against the force of restoring springs into their open position. When the energization is switched off, the ventilating valves 12', 12" fall back into the illustrated closed positions.

By way of hydraulic lines 13, 14, the piston-cylinder unit 5 is connected with two connections of a control valve 15 which is connected by two additional connections with a relatively pressureless hydraulic reservoir 16 and a hydraulic pressure source which, in the illustrated example, is a pump 17 connected on the suction side to the hydraulic reservoir 16. The pump 17 can be driven by an electric motor and/or by the engine of a motor vehicle. Between the hydraulic lines 13, 14, a normally open shut-off valve 18 is arranged which, by the electric energization of its operating magnet, can be brought against the force of a restoring spring system from the illustrated open position into its closed position and can be held in this closed position.

An electronic automatic control and control arrangement 19 is connected on the input side with a generator 20 for the actual value of the steering angle of the front wheels 1. This generator 20 can, for example, cooperate with a rod 3 which, in a steering adjustment of the wheels 1, carries out an adjusting stroke analogous to the actual value of the steering angle. In addition, the input side of the automatic control and control arrangement 19 is connected with a generator 21 for the desired value of the steering angle which is operated by the manual steering wheel 9.

The input side of the automatic control and control arrangement is connected with a torque sensor 22 which detects the forces and torques transmitted between the manual steering wheel 9 as well as the electric motor 10. In addition, a plurality of pressure sensors 23 to 27 are connected to the input side of the automatic control and control arrangement 19 whose signals reflect the hydraulic pressures in the hydraulic lines 6 and 7, 13 and 14 or on the delivery side of the pump 17, i.e., at the delivery input of the control valve 15.

On the output side, the automatic control and control arrangement 19 is connected with the operating magnets of the shut-off valves 11', 11", 18 as well as the ventilating valves 12', 12". Furthermore, the electric motor 10 and the control valve 15 are operated from the output of the automatic control and control arrangement 19.

During the normal operation of the steering system of FIG. 1, the shut-off valves 11', 11", 18 are brought by the automatic control and control arrangement 19, by energizing the assigned operating magnets, into the appropriate positions and are held in these positions. Correspondingly, the piston-cylinder unit 4 is hydraulically uncoupled from the piston-cylinder unit 8 as well as from the manual steering wheel 9.

Between the two piston working spaces of the piston-cylinder unit 5, by operating the control valve 15, a pressure difference is controlled. That is, the automatic control and control arrangement 19 detects by way of the generator 20 the actual value of the steering angle of the front wheels 1. The generator 21 operated by the manual steering wheel 9 defines the desired value of the steering angle. Corresponding to a desired-actual value comparison carried out by the automatic control and control arrangement 19, the operating magnets of the control valve 15 are then controlled.

When no desired-actual value deviation exists, the control valve 15 remains in the illustrated center position, in which the piston-cylinder unit 5 is hydraulically switched to free running and is connected with the reservoir 16. If a desired-actual value deviation occurs, the control valve 15 is displaced from the illustrated center position according to the direction of the desired-actual value deviations toward the right or the left, so that in each case one piston working space of the piston-cylinder unit 5 is controllably connected with the pressure connection of the control valve 15 and the other piston working space of the unit 5 is controllably connected with the reservoir 16. A controllable pressure difference therefore becomes effective at the piston-cylinder unit 5 with the result that the piston-cylinder unit 5 generates an adjusting force in a direction defined by the direction of the desired-actual value deviation of the steering angle. In this manner, a desired-actual value deviation of the steering angle is controlled on a short-term basis, and the front wheels 1 follow the steering adjustment of the manual steering wheel 9.

From the signals of the pressure sensors 25, 26 and/or from the electric voltages and current intensities at the operating magnets of the control valve 15, the automatic control and control arrangement 19 can directly or indirectly determine the pressure difference effective at the piston-cylinder unit 5. The extent of this pressure difference is correlated with the forces and torques transmitted between the steerable front wheels 1 and the piston cylinder unit 5. In correlation with these forces and torques, the automatic control and control arrangement 19 defines a desired value for a manual force which can be felt at the manual steering wheel 9 and is adjusted by the corresponding control of the electric motor 10, with the torque sensor 22 detecting the forces and torques effective between the electric motor 10 and the manual steering wheel 5 and thus detecting the actual value of the manual force. As a result, the motor 10 is therefore automatically controlled as a function of a desired-actual value comparison for the manual forces. In this manner, the driver receives at the manual steering wheel 9 a haptic feedback of the forces which act between the steered vehicle wheels 1 and the piston-cylinder unit 5.

The automatic control and control arrangement 19 monitors itself constantly with respect to correct functioning. Furthermore, the signals of the generators and sensors connected with the input side of the automatic control and control arrangement 19 are constantly checked with respect to plausibility. Should a system error be determined, the operating magnets of the shut-off valves 11', 11" are deenergized. As a result, the shut-off valves 11', 11" switch over into the closed position illustrated in FIG. 1, and the piston-cylinder units 4 and 8 and thus the steerable front wheels 1 and the manual steering wheel 9 are hydraulically forcibly coupled with one another.

To the extent that a sufficient residual function exists of the automatic control and control arrangement 19 as well as of the sensor system interacting therewith, the steering system according to the invention, when the forced coupling is switched on between the manual steering wheel 9 and the steered vehicle wheels 1, operates in the manner of a conventional power steering system. That is, the automatic control and control arrangement 19 controls the control valve 15 such as a function of the forces and torques transmitted between the manual steering wheel 9 and the steered vehicle wheels 1 that the piston-cylinder unit 5 generates a power which reduces the manual force to be applied at the manual steering wheel 9. In this case, the forces and torques transmitted between the manual steering wheel 9 and the steered vehicle wheels 1 can, for example, be determined from the signals of the torque sensor 22 or the signals of the pressure sensors 23, 23, i.e., the pressure difference between the lines 6, 7 reflected by these signals.

Should an emergency operation analogous to a conventional power steering not be possible, the energization of the solenoid of the shut-off valve 18 is switched off so that the shut-off valve 18 takes up its open position illustrated in FIG. 1. The piston-cylinder unit 5, independently of the position of the control valve 15, is hydraulically switched to free running.

As soon as the piston-cylinder units 4, 5 and thus also the steered front wheels 1 and the manual steering wheel 9, are hydraulically forcibly coupled with one another, in the event of an emergency, the ratio between the rotary stroke of the manual steering wheel 9 and the displacement of the rod 3 is defined only by the ratios of sizes of the piston-cylinder units 4 and 8 as well as the constructive development of the mechanical coupling between the manual steering wheel 9 and the piston of the piston-cylinder unit 8.

The corresponding situation also applies to the ratio between the steering angle change of the steerable front wheels 1 and the rotating position change of the manual steering wheel 9. This transmission ratio which exists in the case of a hydraulic forced coupling of the piston-cylinder units 4, 8 generally differs from the transmission ratio which exists in the normal operation between the rotary stroke of the manual steering wheel and the displacement stroke of the rod 3. This latter ratio is determined in a basically arbitrarily definable manner by the control and automatic control arrangement 19, in which case optionally defined parameters may also be taken into account. It is possible, for example, to work in the normal operation during parking maneuvers or at a very low driving speed with a different transmission ratio than at a higher driving speed. The transmission ratios in each case are, however, changed such that the manual steering wheel 9 takes up a defined normal position, when the rod 3 has its center position corresponding to the straight-ahead position of the steerable front wheels 1.

If now the hydraulic forced coupling between the piston-cylinder units 4, 6 starts in a position which deviates from the straight-ahead position of the steered wheels 1 as well as of the manual steering wheel 9, it must generally be assumed that the displacement positions of the rod 3 and the rotating position of the manual steering wheel 9 are assigned to one another in a manner in which the manual steering wheel 9 takes up a position deviating form the above-mentioned normal position, when the rod 3 has its center position, e.e., when the steered wheels 1 are in a straight-ahead position. As a result, the manual steering wheel 9 is no longer centered relative to the steered front wheels 1.

According to the present invention, special measures are now provided so that, also in the event of an emergency operation, i.e., in the mutually hydraulically forcibly coupled piston-cylinder units 4, 8, a centering of the steering system can be achieved. It is taken into account here that, also in the event of an emergency, regularly residual functions of the control and automatic control arrangement 19 as well as of the pertaining sensor system and of the assemblies controlled by the control and automatic control unit 19 are available.

If the control and automatic control arrangement 19 can also evaluate the signals from the actual-value and desired value generator 20, 21, the control and automatic control arrangement 19 "knows" the positions of the rod 3, on one hand, as well as of the manual steering wheel 9, on the other hand, and can determine from these positions in which direction and to what extent a deviation exists with respect to the centering to be endeavored during the forced coupling of the piston-cylinder units 4, 8.

First, the control and automatic control arrangement 19 can now activate a warning signal or indication 29 in order to inform the driver of the non-centered condition of the steering. This condition is not dangerous with respect to technical aspects. The driver is only not accustomed to it. As a result of the warning signal, the driver can steer the vehicle to a parking space or the like at the next opportunity and there—preferably when the vehicle is stopped—switch on an automatic centering mode, for example, by way of a non-self-locking switch arrangement 30, which will remain in its switched-on condition only until it is intentionally operated.

When the centering mode is switched on, the control arrangement 19 can, for example, on one hand, either open the shut-off valve 11' or the shut-off valve 11" and, on the other hand, open the ventilating valve 12" or 12' and rotate the manual steering wheel 9 by the electric motor 10 while the rod 3 essentially stands still, until a centering occurs from the signals of the actual-value and desired-value generator 20 and 21 while the piston-cylinder units 4, 8 are forcibly coupled. As soon as this condition has been reached, the switching-off of the warning indication 29 occurs. In addition, together with the switching-off of the warning indicator 29, the valves 11' to 12" are returned into their closed condition.

In the above-mentioned adjustment of the manual steering wheel 9, hydraulic medium is displaced from the hydraulic line 6 or 7 by way of one of the ventilating valves 12', 12", while, by way of the respective opened shut-off valve 11' or 11" and a line 40, the other hydraulic line 7 or 6 receives hydraulic medium from the line 14.

As an alternative or in addition, a manual centering can also be permitted, for example, in that, while the vehicle is stopped and the centering mode is switched on, the two shut-off valves 11', 11" are opened and the driver rotates the manual steering wheel 9 to the right or the left, until a centering is achieved. In this embodiment, when the centering is reached, the shut-off valves 11', 11" close immediately and thereby reestablish the hydraulic forced coupling between the piston-cylinder units 4, 8. Simultaneously, the warning indicator 29 is switched off when the centering is reached.

Basically, an automatic centering of the steering can also be carried in a similar manner. While the vehicle is stopped and the centering mode is switched on, the control and automatic control arrangement 19 can open the shut-off valves 11', 11" and adjust the manual steering wheel by way of the electric motor 10 until the desired centering occurs.

Figure 2:
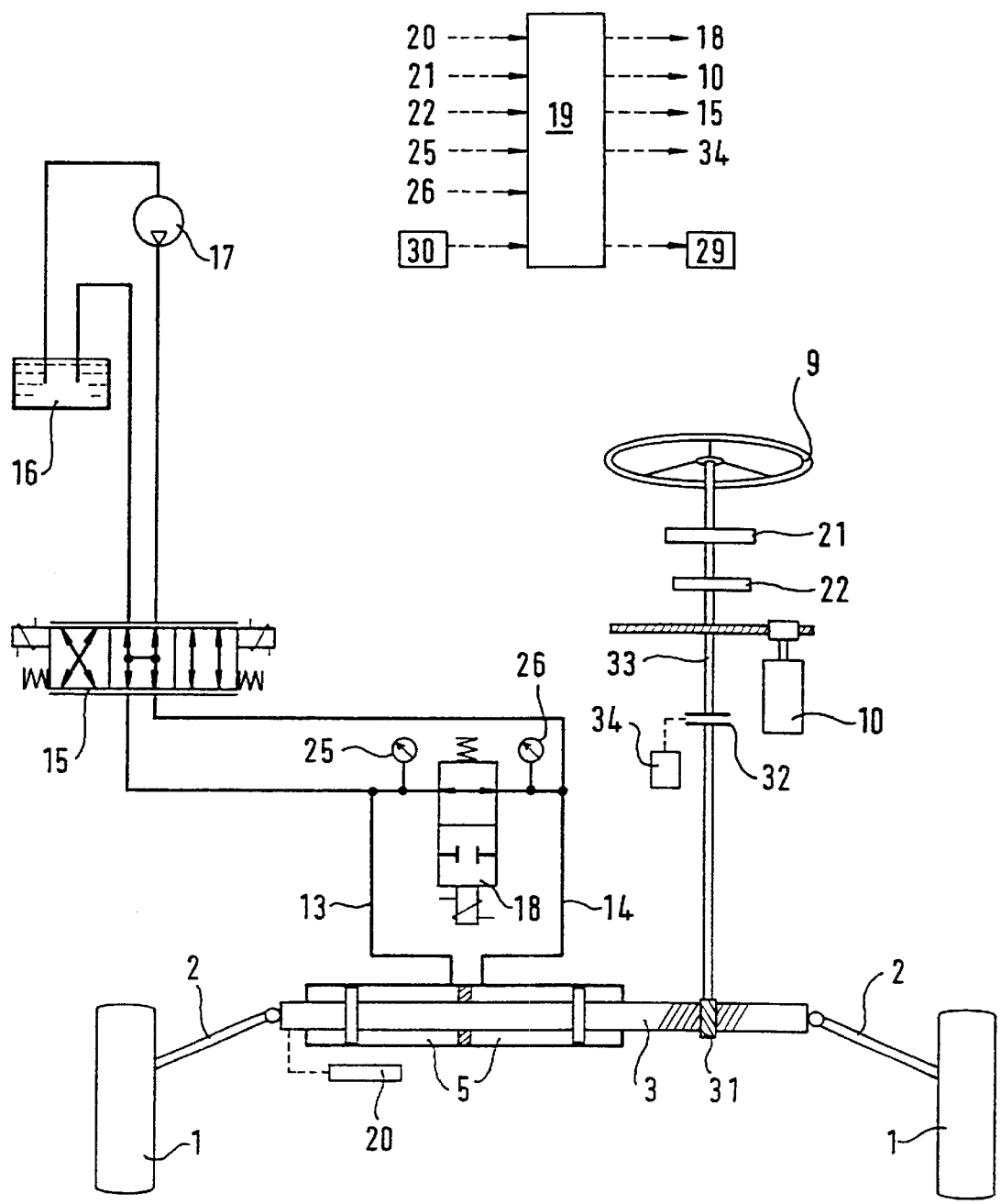
FIG. 2 is a schematic diagram of another embodiment of the present invention.

The embodiment according to FIG. 2 differs from the embodiment according to FIG. 1 mainly in that, for an emergency, a mechanical forced coupling exists between the manual steering wheel 9 and the steered vehicle wheels 1. In FIG. 2, rod 3 is constructed for this purpose in sections as a toothed rack which meshes with a pinion 31 which, in turn, by way of a clutch 32 acted upon by the spring system in the closing direction and an adjoining shaft 33, is mechanically connected with the manual steering wheel 9. The clutch 32 can be opened up by a servo motor 34 and/or hydraulically against the force of its closing spring system in order to interrupt the mechanical through-drive between the steered vehicle wheels 1 and the manual steering wheel 9.

This interrupted condition exists during the normal operation of the steering system. The driver activates the actual steering angle value generator 21 by way of the manual steering wheel 9, and the control and automatic control arrangement 19 operates the control valve 15 such that the desired steering angle is adjusted at the actual steering angle value generator 20. In addition, the electric motor 10, in turn, is controlled for generating a manual force to be felt at the manual steering wheel 9. Should a disturbance occur now, the clutch 32 is automatically closed which, as a rule, results in a non-centered condition of the steering.

In a centering mode, which can be switched on on the driver side, the clutch 32 can temporarily be opened up again, and the manual steering wheel 9 can be adjusted manually or by means of the electric motor 10 such that a centering exists.

For increasing safety, the centering mode can be switched on only when the service brake of the vehicle is operated. Furthermore, for the centering mode, a control which is separate from the control arrangement 19 and/or an independent power supply or battery which is separate from the electric power supply or battery of the control arrangement 19 can be provided.

Deviating from the representation of FIG. 2, the piston-cylinder unit 5 can be constructed as a single double-acting assembly; i.e., only a single piston is arranged on the piston rod 3 to divide the cylinder into two chambers. In this case, the mouths of the lines 13, 14 must be arranged close to the front ends or piston rod glands of the cylinder.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle steering system, comprising:

a manual steering device arranged to be operated on a driver side of a motor vehicle, a steering adjusting assembly for motor-operated steering adjustment of steered vehicle wheels of the motor vehicle, a desired steering angle value generator operated by the manual steering device, an actual steering angle value generator operated by the steered vehicle wheels, an automatic control system configured to operate the steering adjusting assembly as a function of a desired-actual value comparison of the steering angle, a manual force adjuster configured in correlation to forces which occur between the steered vehicle wheels and the steering adjusting assembly, to cause a reaction force at the steering handle as well as an adjusting stroke of the steering handle which is correlated with steering angle changes of the steered vehicle wheels, and an emergency system configured to become automatically operative in the event of system-related disturbances, for at least one of mechanical and hydraulic forced coupling of the manual steering device and the steered vehicle wheels with one another, where, on the driver side, the emergency system, in a centering mode is operable to the centered, while an assignment caused by the switching-on of the emergency system is changed between the positions of the steering handle and of the steered vehicle wheels, such that, relative to the at least one of the steered vehicle wheels and in the straight-ahead position of the steered vehicle wheels, the manual device assumes a defined position.

2. The system according to claim 1, wherein a warning indicator emits a signal when the emergency system is not centered.

3. The system according to claim 1, wherein, with the forced coupling at least partially interrupted, a centering is switchable on with assist by a computer configured to access signals of the desired steering angle value generator and the actual steering angle value generator indicative of positions of the manual steering device and of the steered vehicle wheels, and automatically switching on the forced coupling when a relative position of the manual steering device and the steered vehicle wheels has been reached which matches the centering, and/or a relative movement between the steering handle and the steered vehicle wheels occurs which leads away from such a relative position.

4. The system according to claim 3, wherein means is provided for switching on the centering mode only in a non-self-locking manner.

5. The system according to claim 3, wherein means is provided for switching on the centering mode repeatedly but only for a limited time period.

6. The system according to claim 3, wherein, when the centering mode is switched on, the computer is configured to bring the manual steering device via an assembly, normally used as a manual force adjuster into a position centered relative to the steered vehicle wheels.

7. The system according to claim 1, wherein means is provided for switching on the centering mode as a function of vehicle speed below a speed threshold.

8. The system according to claim 1, wherein means is provided for switching on the centering mode or allowing the centering mode to take place only when a service brake is operated.

9. The system according to claim 1, wherein at least one of a control which is independent of electronic controls of the normal steering operation and a power supply or battery which is independent of the electric power supply or battery for the normal steering operation are operatively arranged for switching on the centering mode or allowing the centering mode to take place.

* * * * *